(12) United States Patent
Lueke et al.

(10) Patent No.: US 9,517,719 B2
(45) Date of Patent: Dec. 13, 2016

(54) METHOD AND DEVICE FOR AUTOMATIC DIRECTION INDICATION

(75) Inventors: Stefan Lueke, Olpe (DE); Matthias Happ, Erfurt-Niedernissa (DE)

(73) Assignees: Continental Teves AG & Co. oHG, Frankfurt am Main (DE); Conti Temic microelectronic GmbH, Nuremberg (DE)

( * ) Notice: Subject to any disclaimer, the term of this patent is extended or adjusted under 35 U.S.C. 154(b) by 329 days.

(21) Appl. No.: 13/124,982

(22) PCT Filed: Sep. 19, 2009

(86) PCT No.: PCT/DE2009/001323
§ 371 (c)(1),
(2), (4) Date: Apr. 19, 2011

(87) PCT Pub. No.: WO2010/045908
PCT Pub. Date: Apr. 29, 2010

(65) Prior Publication Data
US 2011/0199200 A1 Aug. 18, 2011

(30) Foreign Application Priority Data
Oct. 22, 2008 (DE) .......................... 10 2008 043 053

(51) Int. Cl.
*B60Q 1/26* (2006.01)
*B60Q 1/34* (2006.01)
(Continued)

(52) U.S. Cl.
CPC ................ *B60Q 1/38* (2013.01); *B60Q 1/346* (2013.01)

(58) Field of Classification Search
CPC ............. B60Q 1/346; B60Q 1/40; B60Q 1/34; B60Q 1/385; B60Q 1/50; B60Q 9/00; B60K 2741/006; B60K 41/004; B60T 2220/02
See application file for complete search history.

(56) References Cited

U.S. PATENT DOCUMENTS 4,638,295 A * 1/1987 Middlebrook et al. ....... 340/465
5,335,176 A * 8/1994 Nakamura ...................... 701/45
(Continued)

FOREIGN PATENT DOCUMENTS

DE 102 51 357 5/2004
DE 103 55 807 7/2004
(Continued)

OTHER PUBLICATIONS

International Search Report of the International Searching Authority for International Application PCT/DE2009/001323, mailed Feb. 2, 2010, 3 pages, European Patent Office, HV Rijswijk, Netherlands.
(Continued)

*Primary Examiner* — Steven Lim
*Assistant Examiner* — Muhammad Adnan
(74) *Attorney, Agent, or Firm* — W. F. Fasse

(57) ABSTRACT

A method for automatic direction indication for a vehicle includes the following steps:
  detecting a driver activity and/or a vehicle position by a Lane Keeping System and/or a Lane Departure Warning System; and
  automatically activating or deactivating a direction indicator of the vehicle dependent on the detected driver activity or vehicle position.

21 Claims, 6 Drawing Sheets

(51) Int. Cl.
*B60Q 1/22* (2006.01)
*B60Q 1/40* (2006.01)
*B60Q 1/38* (2006.01)

(56) References Cited

U.S. PATENT DOCUMENTS

| | | | |
|---|---|---|---|
| 5,414,407 A * | 5/1995 | Gerrans | B60Q 1/38 |
| | | | 340/457 |
| 5,712,618 A * | 1/1998 | McKenna | 340/475 |
| 5,742,240 A * | 4/1998 | Asanuma | B60K 31/0058 |
| | | | 340/905 |
| 5,925,082 A * | 7/1999 | Shimizu et al. | 701/41 |
| 6,768,933 B2 * | 7/2004 | Serezat | 701/1 |
| 7,119,672 B2 * | 10/2006 | Subbaraman | 340/465 |
| 7,382,236 B2 * | 6/2008 | Maass et al. | 340/436 |
| 8,379,923 B2 * | 2/2013 | Ishikawa | 382/104 |
| 8,825,299 B2 * | 9/2014 | Iwamoto | B62D 5/0493 |
| | | | 340/932.2 |
| 2004/0143381 A1 * | 7/2004 | Regensburger et al. | 701/36 |
| 2005/0062597 A1 * | 3/2005 | Su | 340/475 |
| 2006/0152346 A1 * | 7/2006 | Maass | B60Q 1/346 |
| | | | 340/425.5 |
| 2006/0164226 A1 * | 7/2006 | Hartle | 340/457 |
| 2007/0038336 A1 * | 2/2007 | Yamamura et al. | 701/1 |
| 2008/0047775 A1 * | 2/2008 | Yamazaki | 180/443 |
| 2008/0186154 A1 * | 8/2008 | Haug | 340/435 |
| 2008/0204212 A1 | 8/2008 | Jordan et al. | |
| 2009/0024279 A1 * | 1/2009 | Takeda et al. | 701/41 |
| 2009/0091435 A1 * | 4/2009 | Bolourchi | 340/435 |
| 2010/0138112 A1 * | 6/2010 | Suzuki | B62D 6/002 |
| | | | 701/42 |

FOREIGN PATENT DOCUMENTS

| | | | |
|---|---|---|---|
| DE | 102004048009 | 4/2006 | |
| DE | 102006020631 | 11/2007 | |
| EP | 0 640 903 | 3/1995 | |
| EP | 1 346 877 | 9/2003 | |
| JP | GB 2351192 A * | 12/2000 | B60Q 1/38 |
| WO | WO 03/105108 | 12/2003 | |
| WO | WO 2004/094186 | 11/2004 | |
| WO | WO 2005118372 A1 * | 12/2005 | |

OTHER PUBLICATIONS

English Translation of PCT Written Opinion of the International Searching Authority for International Application PCT/DE2009/001323, mailed Feb. 2, 2010, 5 pages, European Patent Office, HV Rijswijk, Netherlands.

* cited by examiner

METHOD AND DEVICE FOR AUTOMATIC DIRECTION INDICATION

FIELD OF THE INVENTION

The invention relates to a method and to a device for automatic direction indication of a vehicle.

BACKGROUND INFORMATION

The so-called Lane Changing Assistant (LCA) is known from the state of the art. The Lane Changing Assistant is supposed to warn the driver of imminent collisions when he or she changes the traffic lane. The Lane Changing Assistant is usually switched on by activating the flashing direction indicator by the driver, monitors the adjacent traffic lane for potential collision objects, and warns the driver when there is a vehicle in the monitored region.

The Lane Changing Support (LCS) represents a further development. When the driver changes the traffic lane, the Lane Changing Support actively supports the driver by automatically intervening in the steering gear in order to prevent an imminent collision with vehicles in the blind spot on the adjacent traffic lane.

Finally, Lane Departure Warning Systems (LDWS) are known from the state of the art. They warn a driver when he or she leaves his or her own traffic lane obviously unintentionally. Lane Keeping Systems (LKS) go one step further. They can actively intervene in the steering gear in order to prevent the driver from unintentionally leaving his or her own traffic lane. In particular, vehicles are centered in the middle of the traffic lane by the calculated application of steering torques. Both LDW and LK systems are usually deactivated temporarily by switching the flashing direction indicator on since said switch-on operation indicates a change of the traffic lane intended by the driver and no intervention in the steering gear is desired.

Furthermore, so-called comfort flashers or flasher assistants are known from the state of the art. Here, a driver just has to actuate the direction indicator briefly. The direction is then indicated about three or four times, and after that the direction indicator is switched off automatically. However, the disadvantage of said comfort flashers or flasher assistants consists in the fact that the direction indicator is switched off too early in some situations, e.g. when it takes a long time to change the traffic lane, in particular when the speed is high and when the traffic lane is not changed immediately.

SUMMARY OF THE INVENTION

It is therefore the object of the present invention to propose a method and a device for automatic direction indication.

This object is achieved by a method for automatic direction indication and a corresponding device with the features according to the invention.

One basic idea of the invention consists in using a Lane Keeping System and/or a Lane Departure Warning System for automatically driving a direction indicator, such as a flashing direction indicator. In particular, according to the invention, a driver activity and/or a vehicle position can be detected by means of a Lane Keeping System and/or a Lane Departure Warning System, and a direction indication can be automatically controlled in dependence thereon. The Lane Keeping Systems (LK systems) and the Lane Departure Warning Systems (LDW systems) usually require the driver to nevertheless keep his or her hands on the steering wheel in emergency situations, which is also monitored technically. An LK system normally effects a slight centering of the vehicle towards the middle of the traffic lane that can be overridden (by excessively turning the steering wheel) by the driver any time, though. Therefore, LK and LDW systems implement a monitoring of the driver activities, wherein it is detected in particular whether a manual torque of the driver (driver's manual torque) influences the steering gear. According to the invention, said monitoring of the driver activities can now be used for the automation of direction indication. Furthermore, LK and LDW systems implement a traffic lane detection that also enables the vehicle position relative to traffic lanes to be determined. According to the invention, said vehicle position detection can also be used for the automation of direction indication.

According to one embodiment, the present invention relates to a method for automatic direction indication, comprising the following steps:

detecting a driver activity and/or a vehicle position by means of a Lane Keeping System and/or a Lane Departure Warning System; and activating or deactivating a direction indication in dependence on the detected driver activity or vehicle position.

For example, a flashing direction indicator can be activated automatically when a Lane Keeping System detects a driver activity that indicates a lane changing process and when a Lane Departure Warning System further detects that the vehicle is crossing a road marking. The inventive method can also be used for switching a flashing direction indicator off automatically, for example. For this purpose, the end of a lane changing process is determined on the basis of the detected vehicle position, whereupon the direction indicator (flashing direction indicator) is deactivated or switched off.

This method can be implemented, in the form of an algorithm, into an LK or LDW system, whereby such a system can be improved for the automatic activation or deactivation of a direction indication. A driver activity is particularly a driver's manual torque acting upon the steering wheel of the vehicle, e.g. when oversteering the LK system during an intended change of the traffic lane. A vehicle position can be particularly determined by means of a camera-based LK or LDW system.

The detection of a driver activity particularly comprises the detection of a driver's manual torque acting upon the steering wheel of a vehicle and/or the detection of a steering angle by means of a Lane Keeping System and/or a Lane Departure Warning System.

Furthermore, the detection of a driver's manual torque acting upon the steering wheel of a vehicle can comprise detecting the driver's manual torque during a predetermined period of time. For example, it can be provided that a timer is started as soon as a certain magnitude of the driver's manual torque is reached, said timer triggering, for a predetermined period of time, a measurement of the magnitude of the driver's manual torque acting upon the steering wheel. The timer can terminate the measuring process at the end of the predetermined period of time, thereby preventing very short steering maneuvers, e.g. for centering the vehicle in the middle of a traffic lane, from resulting in an automatic direction indication.

Furthermore, the activation of a direction indication in dependence on the detected driver's manual torque can comprise the following steps:

comparing the detected magnitude of the driver's manual torque with a predetermined value of driver's manual torque; and activating the direction indication if said comparison shows that the detected magnitude of the driver's manual torque exceeds the predetermined value of driver's manual torque.

In this manner, those movements of the steering wheel effected by the driver that are slight movements only and are not supposed to effect a deliberate change of direction can be prevented from resulting in an automatic activation of a direction indication.

The activation of a direction indication in dependence on the detected steering angle can comprise the following steps:
determining a deviation of the detected steering angle from a desired steering angle for tracking stability; and
activating the direction indication if the determined deviation exceeds a predetermined deviation.

The activation of a direction indication can furthermore comprise the following steps:
monitoring the surroundings of the vehicle by means of sensors of a surroundings detection system, said sensors being directed towards the back and the side; and
disabling or enabling the automated direction indication in dependence on said monitoring.

For example, the automated direction indication can be disabled when an object was detected by said monitoring of the surroundings, whereby the automatic activation of the direction indication in spite of e.g. the presence of a vehicle on the adjacent traffic lane can be avoided.

The activation of a direction indication can furthermore comprise the following steps:
measuring the traffic lines and monitoring the relative position and the movement of the vehicle relative to the measured traffic lines; and
disabling or enabling the automated direction indication in dependence on said monitoring.

For example, the automatic activation of a flashing direction indicator can be enabled when the measuring of the traffic lines and the monitoring of the relative position and of the movement of the vehicle relative to the measured traffic lines show that the vehicle is changing to the left traffic lane.

The activation of a direction indication can furthermore comprise the following steps:
monitoring the passenger compartment of the vehicle;
detecting reactions of the driver during the monitoring of the passenger compartment; and
disabling or enabling the automated direction indication in dependence on a detected reaction of the driver.

For example, the automated direction indication can be enabled or disabled in dependence on the driver's viewing direction. When the driver is looking to the side, the automated direction indication can be enabled, whereas it is disabled when the driver is looking forward in the direction of traffic.

Furthermore, the automated direction indication can be disabled or enabled in dependence on an evaluation of probability information. For example, a probability of an intended change of the traffic lane can be determined from vehicle passenger compartment information or from surroundings monitoring information or from information about the relative position of the vehicle relative to traffic lines.

Finally, the method can be characterized by the following steps:
activating a direction indication by means of a flasher assistant;
detecting a change of the traffic lane by means of a Lane Keeping System and/or a Lane Departure Warning System and/or based on navigation information; and
deactivating the direction indication when the detection of the change of the traffic lane indicates the end of the lane changing process.

This provides the additional possibility of improving a flasher assistant in such a manner that the direction indicator is prevented from being switched off too early. For example, the detection of the change of the traffic lane carried out for this purpose can be performed by a Lane Keeping System and/or a Lane Departure Warning System since an appropriate functionality for the detection of traffic lane changes is already integrated in such systems in many cases. A detection based on navigation information is also possible, e.g. by means of a navigation system integrated in the vehicle or by means of a portable navigation system if they have an appropriate navigation accuracy.

Furthermore, the method can be characterized by one or several of the following features:
activating or deactivating the direction indication in dependence on the detected driver activity or vehicle position when the traffic lane is changed;
outputting an acoustic and/or visual warning in dependence on the detected driver activity or vehicle position if the direction indicator has not been switched off;
influencing the duration or the number of flashing processes of a direction indication in dependence on the detected driver activity or vehicle position;
outputting an acoustic and/or visual warning in dependence on the detected driver activity or vehicle position that informs about the fact that the driver has not indicated the direction;
using further surroundings information for the discrimination of spurious activations of the direction indication;
using map information of a navigation system for the discrimination of spurious activations;
restricting the availability of the automatic direction indication to specific road types in dependence on map information of a navigation system.

Furthermore, the method can evaluate information of a Traffic Sign Recognition System (TSR system) and enable or disable the automated direction indication in dependence thereon. For example, the automated direction indication can be disabled when a "No Overtaking" sign is recognized.

A further embodiment of the invention relates to a device for automatic direction indication having
control means for a direction indicator, which control means are designed to receive a driver activity signal generated and outputted by a Lane Keeping System and/or a Lane Departure Warning System and to activate or deactivate the direction indicator in dependence on the received driver activity signal.

For example, the device can be implemented as an independent module that can be integrated into a vehicle. It is also possible to implement the device as a circuit that is suitable for being integrated into a driver assistance system or into a Lane Keeping System or into a Lane Departure Warning System. Finally, the device can also be implemented as a chip that is integrated into a system in the vehicle, e.g. into an intelligent flasher assistant system.

The device can be designed to carry out a method according to the invention and as explained above. For example, the device can have a processor with a memory, wherein a program is stored in said memory that can be executed by the processor in order to carry out the inventive method.

Furthermore, it can be provided according to the invention that the line type determined in the lateral guidance system of a camera-based LK or LDW system is also evaluated so that a direction indicator is only switched on in those situations in which it is really necessary to flash. For this purpose, the image processor of the LK or LDW system should be capable of distinguishing between broken lines and continuous lines with respect to the line type of a traffic line. When the LK or LDW system detects that the vehicle is crossing a broken line, the flashing direction indicator can be activated. However, when the system detects that the vehicle is crossing a continuous line, the direction indicator remains inactive as long as the driver does not activate it himself or herself. Besides, further information from radar systems or other driver assistance systems can detect whether there is any space at all into which the vehicle can move. For example, in a situation in which a crash barrier has been detected and classified as such the direction indicator can be deactivated for lack of space into which the vehicle can move.

Furthermore, it can be provided according to the invention that the type of road on which the vehicle is moving is recognized and that the automated direction indication is enabled or disabled in dependence on the recognized road type. For example, it is possible to activate the automated direction indication only in those cases in which the vehicle is on a type of road for which the function "Automatic Direction Indication" has been enabled. For example, the system can be inactive when the vehicle is on a country road, whereas it can be in operation or can be activated when the vehicle is on a motorway.

Finally, the invention can also provide that the flashing period can be discretely reduced or extended to whole flashing processes.

Further advantages and possible applications of the present invention can be inferred from the following description in conjunction with the exemplary embodiment/s illustrated in the drawing/s.

The terms and assigned reference numerals used in the attached list of reference numerals are used in the description, in the claims, in the abstract, and in the drawing/s.

BRIEF DESCRIPTION OF THE DRAWINGS

The drawings show, in

DETAILED DESCRIPTION OF EXAMPLE EMBODIMENTS OF THE INVENTION

Figure 1:
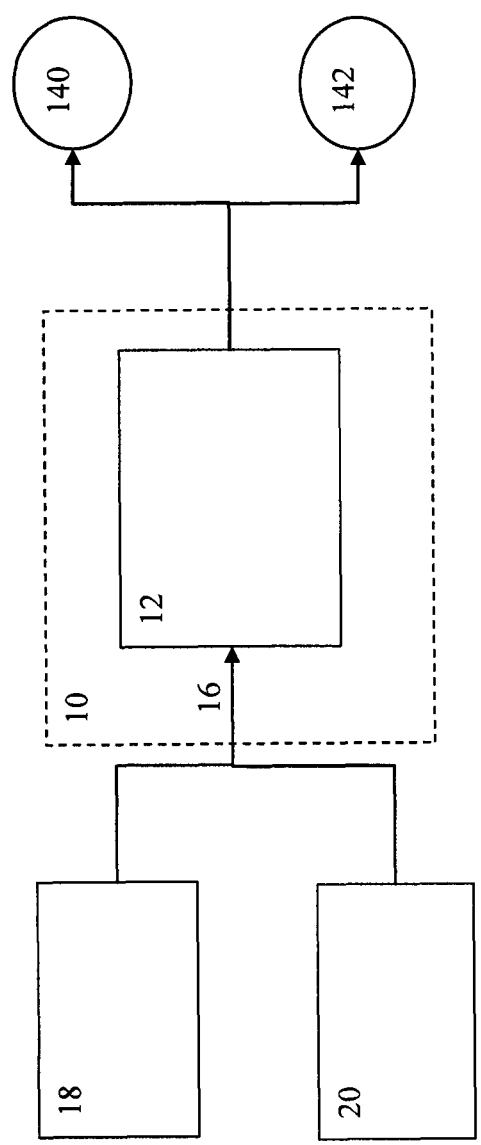
FIG. 1 a block diagram of an exemplary embodiment of a device for automatic direction indication according to the invention.

In the following, identical reference numerals may be assigned to similar and/or functionally similar elements.

FIG. 1 shows a device 10 for automatic direction indication. The device 10 drives direction indicators in the form of flashing direction indicators 140 and 142 that are installed on the left side and on the right side, respectively, of a vehicle in which the device 10 is implemented. Furthermore, a Lane Keeping System 18 and a Lane Departure Warning System 20 are integrated in the vehicle. It is also possible that only one of the two systems 18 and 20 is integrated in the vehicle a time in order to serve the purposes of the invention. However, it is essential that the Lane Keeping System 18 integrated in the vehicle and the Lane Departure Warning System 20 can detect the driver activity or vehicle position with respect to traffic lines and each can output a driver activity signal and a vehicle position signal 16, respectively.

In particular, the device 10 can be integrated in a driver assistance system in the form of software. For example, the driver assistance system can have a microcontroller and a program memory, in which program memory a control program for comfort functions in the vehicle is stored, which control program is executed by the microcontroller. The microcontroller can control various comfort systems (particularly an automatic direction indication) in the vehicle according to the executed program.

Figure 2:
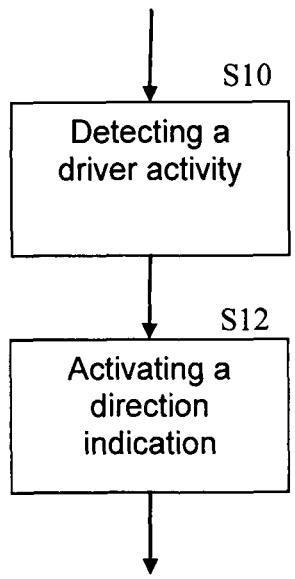
FIG. 2-7 flow charts of various exemplary embodiments of algorithms that implement the inventive method for automatic direction indication or steps thereof.
Figure 3:
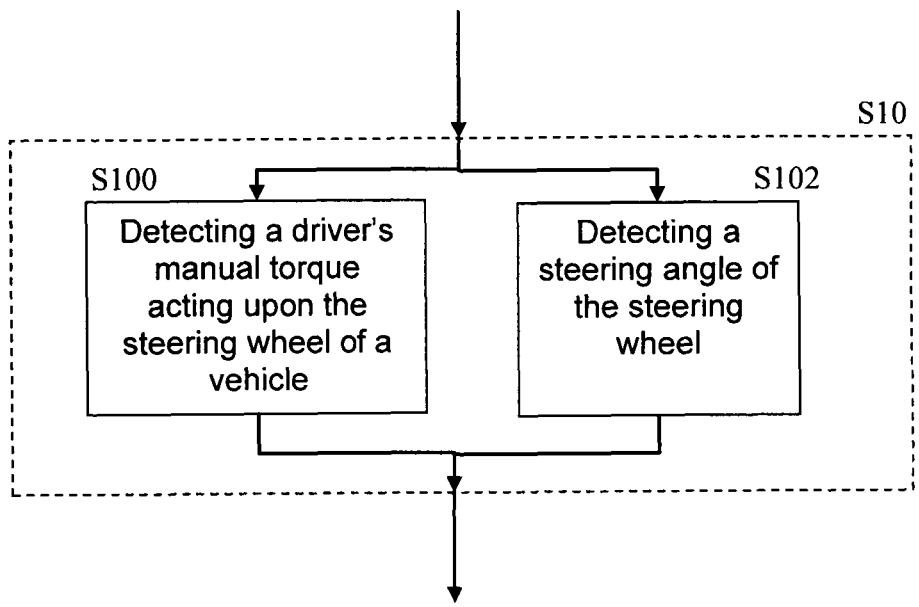

In the following, various exemplary embodiments of algorithms that implement the inventive method for automatic direction indication are explained by means of the flow charts shown in FIG. 2-7:

FIG. 2 shows a simplified flow chart of an algorithm that implements the automatic direction indication according to the invention. The algorithm has the two steps S10 and S12. In step S10, a driver activity is detected by means of a Lane Keeping System and/or a Lane Departure Warning System, wherein a driver activity can be detected in various ways, as shown in FIG. 2: One possibility consists in detecting a driver's manual torque of the driver (manual torque) acting upon the steering wheel of the vehicle (substep S100). As an alternative or in addition, a steering angle can be detected (substep S102). In the next step, in step S12, a direction indication is controlled in dependence on the detected driver activity. For example, the left or the right flashing direction indicator is activated when the detected driver activity shows that a driver's manual torque is effective acting upon the steering wheel anti-clockwise or clockwise, respectively, or that there is an anti-clockwise or clockwise steering angle, respectively, since the driver is steering the vehicle to the left or to the right, respectively.

For example, the manual torque applied by the driver can be determined by means of a steering torque sensor installed in the steering rod near the steering wheel, wherein the torsion acting upon a defined piece (upon which the manual torque and the inertia of the steering wheel act) is measured. As an alternative, the torque subjecting the steering rod and the steering gear to stress in the form of torsion can be measured by means of two steering angle sensors. The difference between the steering angles that results from the forces can be measured, and said difference can be used for calculating the torque since the torsional behaviour is known. Disturbance variables resulting from the mass of the steering rod and of the steering wheel can be neglected in the case of a longer measuring time or of a higher actuating power on account of the overcoming of the torques applied by the steering gear in the lateral control operation. If this is not sufficient because the driver's torque has to be detected as quickly as possible, the torque resulting from the change of the steering angle in the case of a known inertial behaviour of the steering wheel can be calculated and subtracted from the measured torque acting upon the steering rod or the steering system.

In the following it will be explained in detail on the basis of exemplary embodiments in conjunction with FIG. 4 and FIG. 5 how the direction indication can be controlled in dependence on a detected driver activity.

Figure 4:
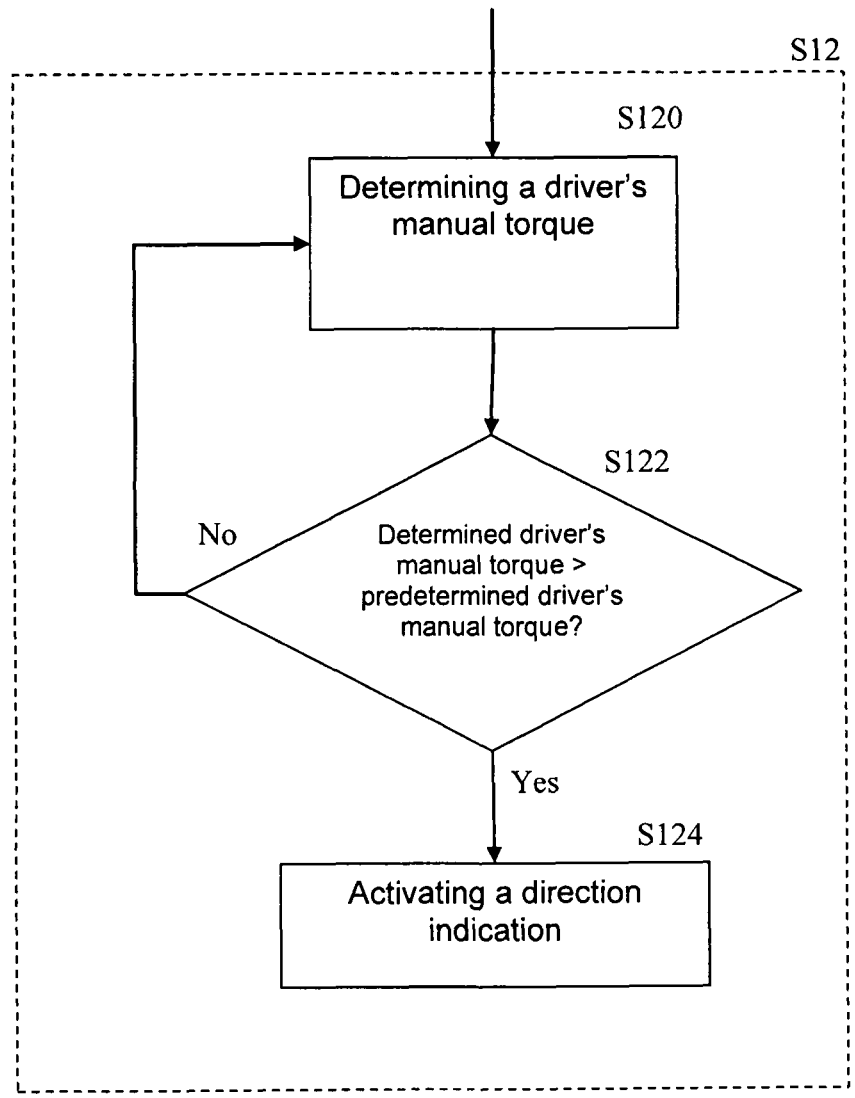

FIG. 4 shows various substeps of step S12 by means of which a driver activity in the form of a driver's manual torque acting upon the steering wheel of the vehicle is processed. First, in step S120, the magnitude of the driver's manual torque acting upon the steering wheel is determined, e.g. by means of a driver's manual torque sensor or two steering angle sensors as described above. In the next step, in step S122, a check is made to see whether the determined magnitude of the driver's manual torque exceeds a predetermined value of driver's manual torque that corresponds to a typical minimal value of driver's manual torque that has to be applied to the steering wheel by the driver in the case of an intended change of the direction of motion of the vehicle. If in step S122 the determined magnitude of the driver's manual torque is found to be smaller than the predetermined value of driver's manual torque, then the procedure returns to step S120 where the magnitude of the driver's manual torque currently acting upon the steering wheel is determined again. Otherwise, if the determined magnitude of the driver's manual torque exceeds the predetermined value of driver's manual torque, then the procedure proceeds to step S124 where the direction indication is activated according to the direction of the driver's manual torque acting upon the steering wheel. If the driver's manual torque acts anti-clockwise, then the left flashing direction indicator is activated. If the driver's manual torque acts clockwise, then the right flashing direction indicator is activated.

Figure 5:
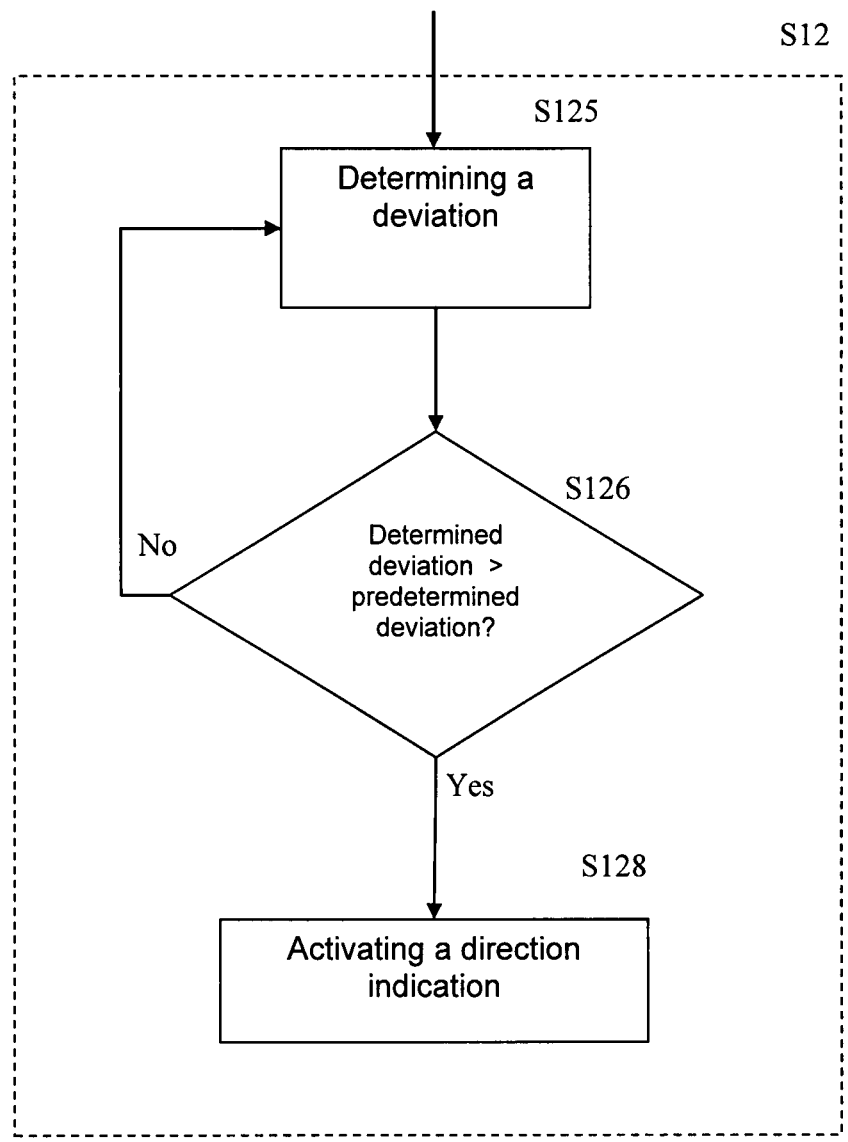

Similarly in FIG. 5, various substeps of the step S12 are shown, with which however, on the basis of a control deviation between the driven steering angle and the desired steering angle for lane-keeping or tracking stability, it is determined whether a direction indication is to be activated. A Lane Keeping System can measure and output the driven steering angle and the desired steering angle. On the basis of these two steering angle values, a deviation can be determined in step S125, i.e. the difference between the current steering angle and the desired steering angle, said desired steering angle being predetermined by the Lane Keeping System for tracking stability. In the next step, in step S126, the determined deviation can be compared with a predetermined deviation that is calculated such that the Lane Keeping System is only just able, in compliance with the predetermined deviation, to keep the lane. If the determined deviation is smaller, the procedure returns to step S125 where the current deviation is determined again. Otherwise, if the current deviation exceeds the predetermined deviation, the direction indication is activated in step S128 in dependence on the preceding sign of the current steering angle. If the current steering angle is negative, the vehicle is steered in the anti-clockwise direction and the left flashing direction indicator is activated. Otherwise, if the current steering angle is positive, the vehicle is steered in the clockwise direction and the right flashing direction indicator is activated.

Figure 6:
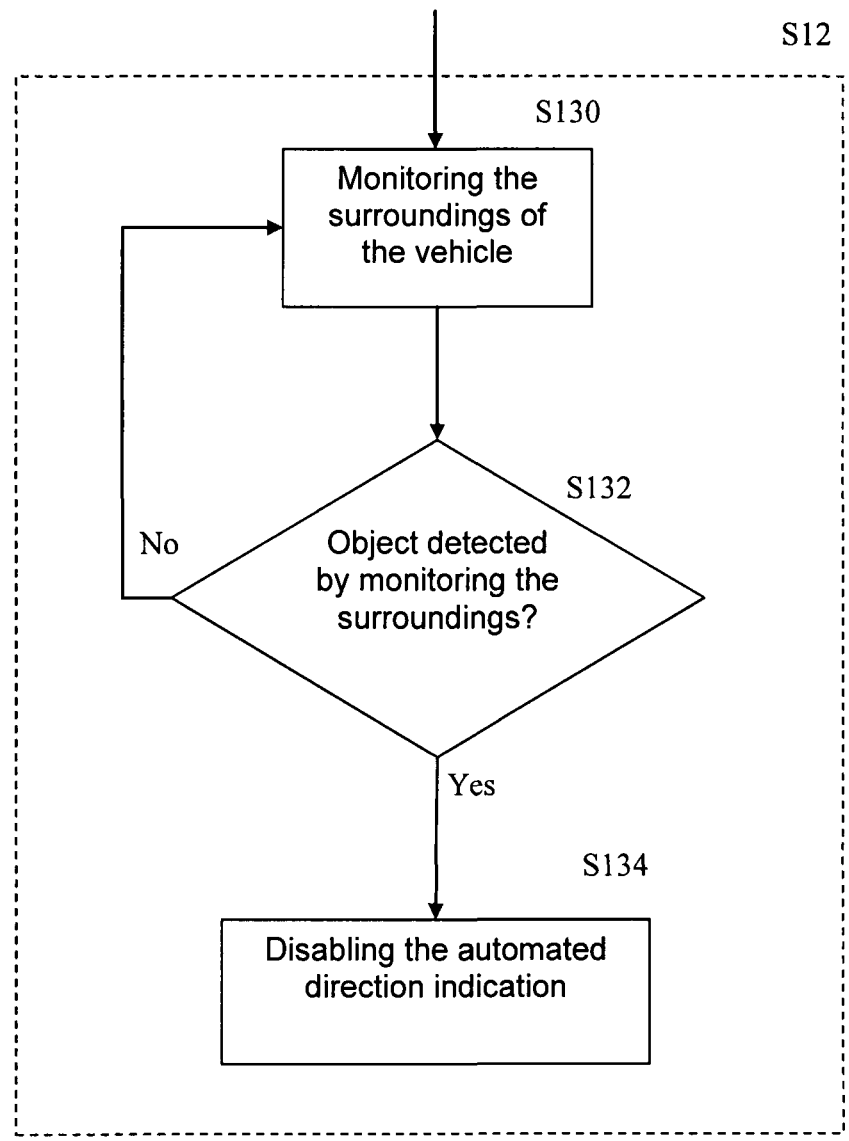

FIG. 6 shows a further exemplary embodiment of substeps of step S12. This exemplary embodiment can be carried out in addition to the substeps shown in FIG. 4 and FIG. 5, in particular as a parallel routine of the algorithm for implementing the automatic direction indication. In step S130, the surroundings of the vehicle can be monitored for potential collision objects, e.g. vehicles on adjacent traffic lanes or in the blind spot of the vehicle, by means of a surroundings monitoring system of the type that is used for a driver assistance system or for Adaptive Cruise Control (ACC), for example. If in step S132 an object is found to be detected in the surroundings of the vehicle, in particular on the adjacent traffic lane or in the blind spot, the automatic activation of the direction indication can be disabled in step S134. Otherwise, if no object is detected, the procedure can return to step S130. Thus, safety can be enhanced by monitoring the surroundings and disabling the automatic direction indication since the flashing direction indicator is not automatically activated when a potential collision object is detected, for example.

Figure 7:
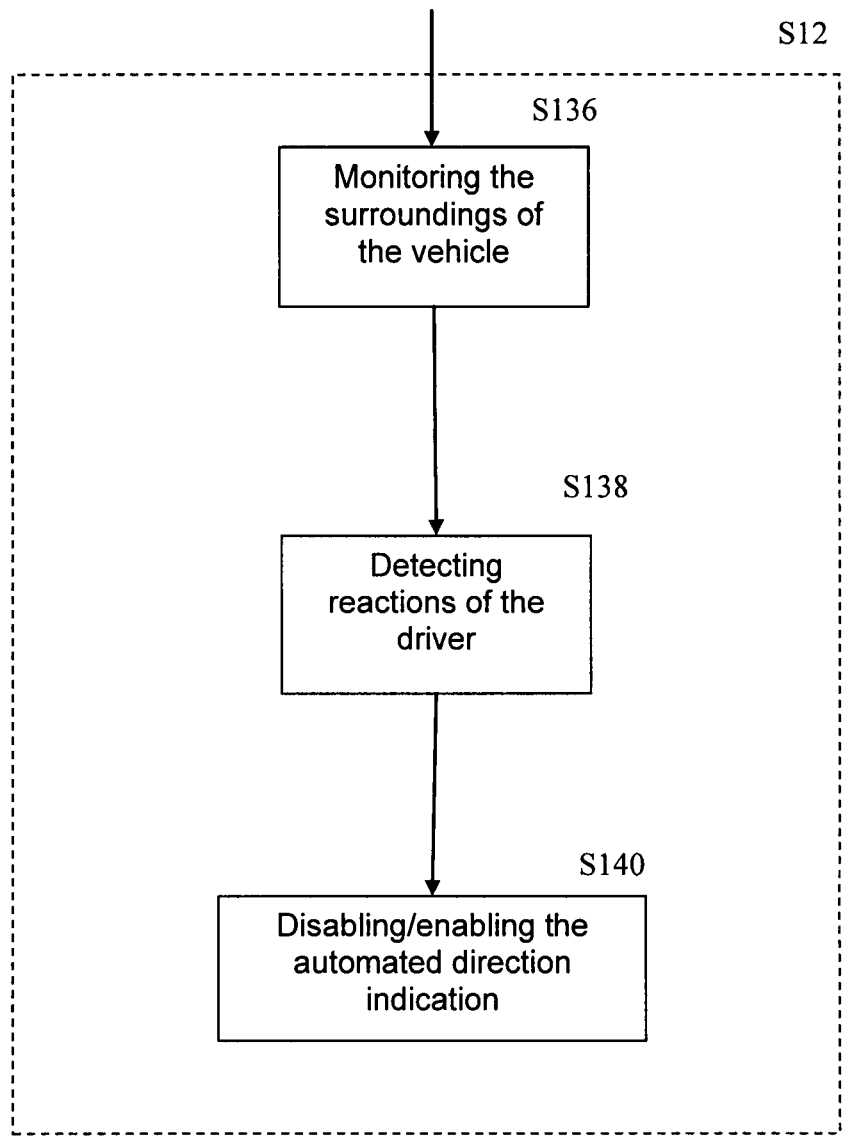

It is also possible to enable or disable the automatic direction indication in dependence on a monitoring of the passenger compartment of the vehicle, as shown in FIG. 7. The passenger compartment of the vehicle, particularly the driver, can be monitored by means of a camera (step S136). In step S138, reactions of the driver are detected and evaluated on the basis of said monitoring of the passenger compartment. For this purpose, the camera images are evaluated by a special image processing algorithm that detects movements of the driver, particularly the driver's viewing direction. When the algorithm detects that the driver is looking to the right or to the left for a certain period of time, the automatic activation of the direction indication can be enabled or permitted since it can be assumed that the driver intends to change the direction of motion of the vehicle. Otherwise, when the algorithm detects that the driver is looking straight on for a longer period of time, the automatic direction indication can be disabled since it can be assumed that the driver does not intend to change the direction of motion of the vehicle. The passenger-compartment-monitoring-based enabling or disabling of the automatic direction indication provides the possibility of improving the reliability of the automatic system since a further criterion, namely the reactions of the driver, is taken into consideration.

The exemplary embodiment explained in the following illustrates that the automatic direction indication according to the invention can also improve a flasher assistant. Lane Keeping Systems and Lane Departure Warning Systems that are based on camera sensor technology continuously detect road markings and detect traffic lanes on the basis of the detected road markings. Therefore, such LDW and LK systems are basically suitable for detecting lane changing processes of a vehicle completely, i.e. from the beginning to the end. Information about a change of the traffic lane that can be supplied by these systems can now be used for controlling the automatic direction indication in the following manner: At first, a direction indication is activated either by means of a flasher assistant by the driver or fully automatically after the detection of the vehicle crossing a traffic line. When the system detecting a change of the traffic lane indicates the end of the lane changing process, the direction indication is deactivated, wherein the direction indicator is deactivated or switched off intelligently on the basis of the LDW or LK system, in contrast to conventional flasher assistants that usually switch a direction indicator off in a time-controlled manner. This function can be integrated into the software of an LDW or LK system by generating a signal that indicates the end of the lane changing process. This signal can be supplied to the circuit of a flasher assistant in order to deactivate an activated direction indication. As an alternative to or in addition to the information about changes of traffic lanes supplied by LDW or LK systems it is also possible to use navigation information for detecting a change of the traffic lane for deactivating a direction indication.

The invention makes an automatic direction indication using functionalities of Lane Keeping Systems or Lane Departure Warning Systems possible. In particular, the invention can be directly integrated into such systems, whereby the functionality of these systems can be extended.

REFERENCE NUMERALS

10 device for automatic direction indication
12 activating means for a direction indicator 140, 142

140 direction indicator
142 direction indicator
16 driver activity signal
18 Lane Keeping System
20 Lane Departure Warning Systems

The invention claimed is:

1. A method for automatic direction indication for a vehicle, comprising the following steps:
   measuring a torque magnitude of a driver's manual torque acting upon a steering wheel of the vehicle,
   comparing the measured torque magnitude with a predetermined torque value,
   detecting a vehicle position of the vehicle by a Lane Keeping System and/or a Lane Departure Warning System of the vehicle, and
   only when the comparing determines that the measured torque magnitude exceeds the predetermined torque value, then automatically activating or deactivating a direction indicator of the vehicle in response to and dependent on the detected vehicle position.

2. The method according to claim 1, characterized in that the measuring of the torque magnitude of the driver's manual torque is performed during a predetermined period of time, and the direction indicator is activated only if the driver's manual torque continues to act upon the steering wheel during the entire predetermined period of time.

3. The method according to claim 1, wherein the automatic activating or deactivating of the direction indicator comprises automatically activating the direction indicator.

4. The method according to claim 1, further comprising:
   monitoring surroundings of the vehicle by sensors of a surroundings detection system of the vehicle, said sensors being directed toward a back and a side of the vehicle; and
   disabling or enabling the automatic activating of the direction indicator, dependent on said monitoring.

5. The method according to claim 4, further comprising disabling or enabling the automatic activating of the direction indicator, dependent on an evaluation of probability information regarding said monitoring.

6. The method according to claim 1, further comprising:
   detecting traffic lane markings on a road on which the vehicle is driving, and monitoring a relative position and a movement of the vehicle relative to the detected traffic lane markings, wherein said vehicle position is said relative position; and
   disabling or enabling the automatic activating of the direction indicator, dependent on said monitoring.

7. The method according to claim 6, further comprising disabling or enabling the automatic activating of the direction indicator, dependent on an evaluation of probability information regarding said monitoring.

8. The method according to claim 1, further comprising:
   monitoring a passenger compartment of the vehicle;
   detecting reactions of the driver during the monitoring of the passenger compartment; and
   enabling or disabling the automatic activating of the direction indicator dependent on a detected reaction of the driver.

9. The method according to claim 8, further comprising disabling or enabling the automatic activating of the direction indicator, dependent on an evaluation of probability information regarding said monitoring.

10. The method according to claim 1, further comprising automatically activating or deactivating the direction indicator dependent on the measured torque magnitude of the driver's manual torque and the vehicle position when the vehicle changes traffic lanes.

11. The method according to claim 1, further comprising evaluating information of a Traffic Sign Recognition System and disabling or enabling the automatic activating of the direction indicator dependent thereon.

12. The method according to claim 1, wherein the direction indicator comprises flashing direction indicator lights installed on an exterior of the vehicle.

13. A device adapted to carry out the method according to claim 1, wherein said device comprises control means for a direction indicator, which control means are configured and adapted to receive a measured driver's manual torque magnitude signal and a vehicle position signal generated and outputted by a Lane Keeping System and/or a Lane Departure Warning System, to compare the measured torque magnitude with a predetermined torque value, and to automatically activate or deactivate the direction indicator dependent on the vehicle position signal only when the measured torque magnitude exceeds the predetermined torque value.

14. The method according to claim 1, further comprising outputting an acoustic and/or visual warning dependent on the measured torque magnitude of the driver's manual torque and the vehicle position if the direction indicator has not been switched off.

15. The method according to claim 1, further comprising influencing a duration or a number of flashes of the direction indicator dependent on the measured torque magnitude of the driver's manual torque and the vehicle position.

16. The method according to claim 1, further comprising outputting an acoustic and/or visual warning, dependent on the measured torque magnitude of the driver's manual torque and the vehicle position, that informs about a fact that the driver has not activated the direction indicator.

17. The method according to claim 1, further comprising using surroundings information for a discrimination of a spurious activation of the direction indicator.

18. The method according to claim 1, further comprising using map information of a navigation system for a discrimination of a spurious activation of the direction indicator.

19. The method according to claim 1, further comprising restricting availability of the automatic activating of the direction indicator to specific road types dependent on map information of a navigation system.

20. A device for automatic direction indication for a vehicle having a controller configured to control a direction indicator of the vehicle, which controller is configured and adapted to receive a measured driver's manual torque magnitude signal indicating a measured torque magnitude of a driver's manual torque acting upon a steering wheel of the vehicle, and a vehicle position signal generated and outputted by a Lane Keeping System and/or a Lane Departure Warning System of the vehicle, to compare the measured torque magnitude with a predetermined torque value, and to automatically activate or deactivate the direction indicator in response to and dependent on said vehicle position signal only when the measured torque magnitude exceeds the predetermined torque value.

21. A method of operating a driver assistance system to provide automatic direction indication for a vehicle, comprising the steps:
   a) with the driver assistance system, detecting a vehicle position of the vehicle relative to a traffic lane on a road on which the vehicle is driving;

b) with at least one sensor, measuring a torque magnitude of a driver's manual torque acting on a steering wheel of the vehicle;
c) with a processor or controller circuit, comparing the torque magnitude with a predetermined torque value;
d) with the processor or controller circuit, automatically activating an exterior direction indicator of the vehicle, only if step a) determines that the vehicle position is deviating from the traffic lane and step c) determines that the torque magnitude exceeds the predetermined torque value.

* * * * *